United States Patent
Routliffe

(10) Patent No.: US 6,826,149 B1
(45) Date of Patent: Nov. 30, 2004

(54) TRANSMISSION RATE CONTROL SYSTEM FOR ATM CELLS

(75) Inventor: Stephen Routliffe, Kanata (CA)

(73) Assignee: Zarlink Semiconductor Inc., Ottawa (CA)

(*) Notice: Subject to any disclaimer, the term of this patent is extended or adjusted under 35 U.S.C. 154(b) by 745 days.

(21) Appl. No.: 09/691,945

(22) Filed: Oct. 20, 2000

(30) Foreign Application Priority Data

Oct. 27, 1999 (GB) .............................................. 9925313

(51) Int. Cl.⁷ ........................... G08C 15/00; H04J 1/16; H04J 3/14; H04L 12/26
(52) U.S. Cl. ...................................... 370/230; 370/235
(58) Field of Search .............................. 370/230, 395.1, 370/231, 232, 233, 234, 235, 474, 395.4, 395.42, 395.43, 395.61, 230.1

(56) References Cited

U.S. PATENT DOCUMENTS

| | | | | |
|---|---|---|---|---|
| 5,740,173 A | * | 4/1998 | Fiorini | 370/394 |
| 5,953,336 A | * | 9/1999 | Moore et al. | 370/395.43 |
| 5,974,033 A | * | 10/1999 | Kamiya et al. | 370/230.1 |
| 6,058,114 A | * | 5/2000 | Sethuram et al. | 370/397 |
| 6,256,308 B1 | * | 7/2001 | Carlsson | 370/395.43 |
| 6,272,109 B1 | * | 8/2001 | Pei et al. | 370/230 |
| 6,449,252 B1 | * | 9/2002 | Marsteiner | 370/230 |
| 6,480,511 B1 | * | 11/2002 | Petty | 370/509 |

FOREIGN PATENT DOCUMENTS

| EP | 0 702 474 A1 | 3/1996 |
|---|---|---|
| JP | 10 65681 | 3/1998 |

* cited by examiner

*Primary Examiner*—Wellington Chin
*Assistant Examiner*—Jamal A. Fox
(74) *Attorney, Agent, or Firm*—Marks & Clerk

(57) ABSTRACT

A cell transmission rate controller for use in providing constant bit rate services in an ATM or like network has a predictor for determining the payload size of the next cell, and a plurality of buffers for storing TDM data. A control circuit monitors the buffers and generates a trigger signal to produce a cell when sufficient TDM data has accumulated to fill the next cell.

18 Claims, 1 Drawing Sheet

TRANSMISSION RATE CONTROL SYSTEM FOR ATM CELLS

FIELD OF THE INVENTION

This invention relates to a transmission rate control system that supports dynamic bandwidth allocation for a circuit emulation service in a connection-oriented packet switched network, such as ATM (Asynchronous Transfer Mode). This mode of operation is described in the ATM Forum specification number af-vtoa-0085.000.

BACKGROUND OF THE INVENTION

For convenience the invention will be described with reference to ATM, which is a global standard for a cell-relay, connection-oriented network, although persons skilled in the art will recognize that the invention is applicable to other packet switched networks.

In ATM, an incoming data stream is segmented into 53 byte cells, which have five bytes of header and 48 bytes of payload. The ATM cells from different sources are statistically multiplexed over physical links to create virtual channels between endpoints. ATM offers various types of service, of which AAL1, which stands for ATM Adaptation Layer 1, is of interest for the present application.

AAL1 service is a constant bit rate (CBR) service, suitable for carrying voice traffic. AAL1 appears to the user as a circuit connection that permits the setting up of telephone calls in a manner similar to a conventional telephone circuit. For this reason, it is known as a circuit emulation service (CES) because virtual circuits can carry multiple telephone channels in a manner that to the user appears analogous to physical circuits.

Typically, multiple telephone calls are carried on trunks, which may in reality be time division multiplexed trunks, such as T1 trunks, which carry 24 simultaneous calls in 24 time slots per frame. Each time slot carries 8 bits and the frame repeat at 8 KHz, giving a transmission rate per channel of 64 kb/s.

More and more users are setting up ATM virtual circuits to from wide area networks, and such users are desirous of using these circuits to carry voice data. In order to convert incoming voice channels into a suitable form for transmission over these virtual circuits, the incoming data must be assembled into cells, which must then be transmitted at the appropriate time and disassembled at the far end. A device for performing this function is known as a SAR (Segmentation and Reassembly) device.

To provide a constant bit rate service, some means must be found to determine when to produce cells for transmission. Historically, a scheduler mechanism has been used in which TDM basic frames are counted and cells are produced after a fixed number of TDM frames have occurred.

In a constant bit rate service, for example, carrying voice, there will be periods of silence when neither party is talking. Since it is wasteful of ATM bandwidth to transmit silence, the Dynamic Bandwidth Circuit Emulation Service (DBCES) was introduced. This dynamically allocates available ATM bandwidth to incoming TDM channels. The scheduler system is unsuitable for DBCES applications due to the variable number of TDM frames between cells depending on the amount of silence in the TDM voice channels.

An object of the invention is to provide a cell rate transmission control system (CTRCS) compatible with DBCES operations.

SUMMARY OF THE INVENTION

According to the present invention there is provided a cell transmission rate controller for use in providing constant bit rate services in a cell relay network, comprising a predictor for determining the payload size of the next cell in a virtual circuit established in said cell relay network, and a control circuit for monitoring buffers storing incoming TDM data and generating a trigger signal to produce a cell when sufficient TDM data has accumulated to fill the next cell.

A Cell Transmission Rate Control System (CTRCS) in accordance with the invention is used in the Segmentation Sub-layer of an ATM Adaptation Layer type 1 (AAL1). It synchronizes ATM cell production to an isochronous TDM link rate. The CTRCS allows the SAR to support Circuit Emulation Service (CES) as described in the ATM Forum Specification, af-vtoa-0078.00. In addition the CTRCS may be used in SAR implementations which support Dynamic Structure Sizing (DSS) as described in the ATM Forum Specification, af-vtoa-0085.000.

The CTRCS determines the number of bytes or octets in the next cell which are available to transport TDM information. The CTRCS monitors a number of circular buffers (one for every channel in the VC) which are being filled with TDM information. When enough data has accumulated to fill the next cell the CTRCS will trigger the Segmentation System to produce a cell. A single CTRCS may be used with multiple virtual circuits and multiple links. There is no limit to the number of channels which may be carried by the VC and the CTRCS may be configured to support E1/DS1/J2 N×64 AAL1 structures with Common Channel Signaling (CCS) and Channel Associated Signaling (CAS).

The CTRCS thus serves a replacement for the scheduler in DBCES applications. A further advantage of the CTRCS is that whereas a separate scheduler is required for each TDM link which is supported by the SAR, a single CTRCS is capable of supporting any number of TDM links and an unlimited number of virtual circuits (VCs).

BRIEF DESCRIPTION OF THE DRAWINGS

The invention will now be described in more detail, by way of example, only with reference to the accompanying drawings, in which.

DETAILED DESCRIPTION OF THE PREFERRED EMBODIMENTS

Figure 1:
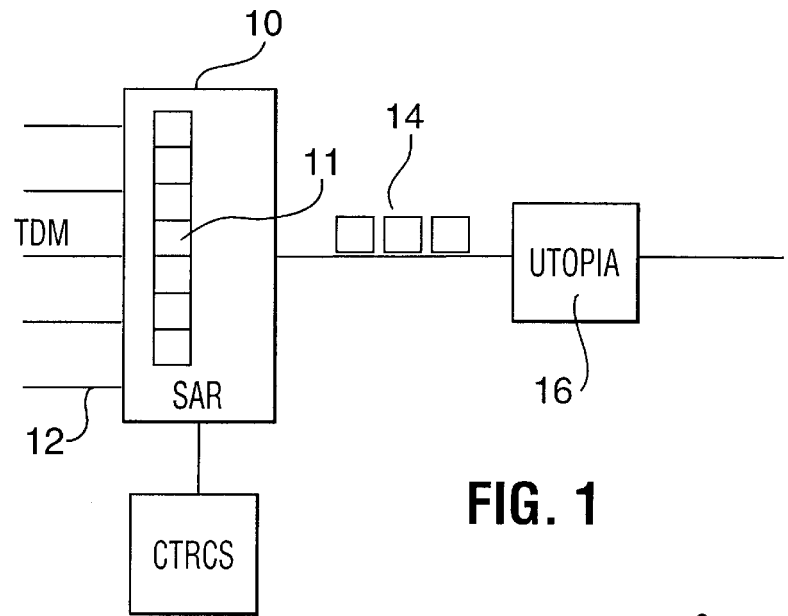
FIG. 1 is a block diagram of a an ATM circuit emulation system.
Figure 2:
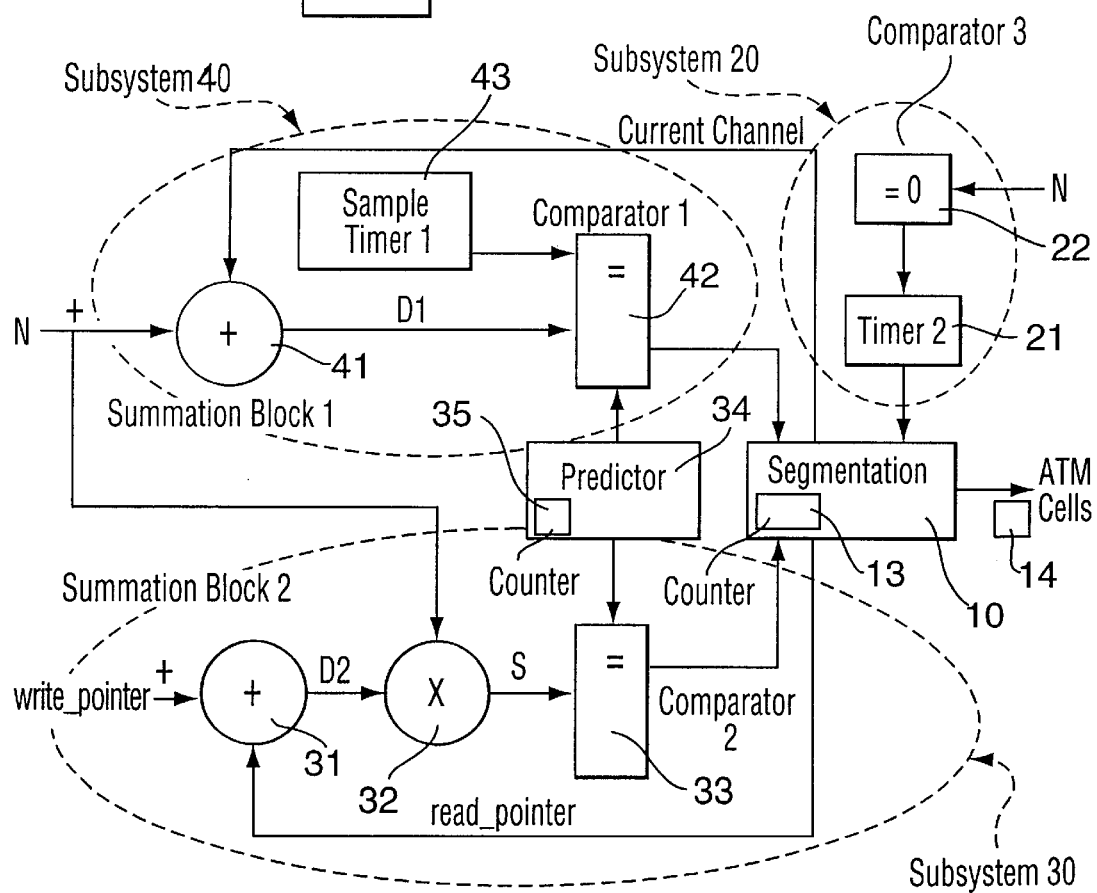
FIG. 2 is a more detailed block diagram of a cell rate transmission control system in accordance with the principles of the invention.

In FIG. 1 a SAR 10 receives with circular buffers 11 a series of TDM trunks 12 and outputs a series of ATM cells 14 via UTOPIA interface 16. The creation of cells 14 is controlled by CTRCS 18 shown in more detail in FIG. 2.

The CTRCS comprises three subsystems 20, 30, 40 connected to the segmentation unit 10 producing the ATM cells 14.

Subsystem 20 determines when a cell carrying an inactive structure, i.e. no channels (N=0) is produced. The document af-vtoa-0085.000 referred to above gives more information on inactive structures. The subsystem contains a comparator 21 and programmable timer 22, which sets the period between cells to be less than 500 ms. The TDM basic frame is used as the time base for the counter. This system is only required in DSS applications.

Subsystem 30, which will now be described in detail, causes a cell to be produced when enough TDM data (bytes) has accumulated to fill a cell. This system is used in CES and in DSS when N>0 (active structure).

The subsystem 30 comprises a summation block 31, a multiplier 32, a comparator 33, and a predictor 34. TDM information from incoming TDM trunks is written to circular buffers 11 that are contained in dual or single port RAM. There is a separate circular buffer for every TDM channel. Typically, the buffers 11 are 64 bytes deep, but any size may be used. The location in each buffer where the last data was written is input to the CTRCS in the form of a write_pointer. The Segmentation block 19 maintains a read pointer to determine the location of the next byte within the buffers to be placed in the next cell to be created. Summation Block 31 is responsible for determining the difference between the read pointer and write pointer (D) as described below:

If the write pointer is greater than the read pointer, then the difference, D=write pointer—read pointer. If the write point is NOT greater than the read pointer, then D=the buffer size—(read pointer—write pointer). Hence, D represents the number of TDM basic frames that have elapsed since the last cell was sent.

The multiplier block 32 determines the number of TDM bytes that have accumulated (S), which is the product of the number of TDM basic frames that have elapsed since the last cell and the number of TDM channels being transported by the cell (N).

$$S=D \times N$$

In a Virtual Circuit that does not support DSS, N is a constant which is set by the user when the VC is established. In DSS systems, N will change when the structure is resized.

The comparator block 33 compares S with the predicted size of the next cell payload (PS). If S is greater than or equal to PS a signal will be sent to the Segmentation Block and a cell will be produced. The read pointer will be updated.

The predictor 34 determines the payload size (PS) of the next cell. In order to do this it is necessary to:
Determine if the next cell is a pointer cell
Determine the number of masking octets (NMASK) in the next cell.
Determine the number of CAS octets (NCAS) in the next cell.

Once these values have been determined, the pay load size is then determined using the following algorithm:
If the cell needs to contain a pointer, then PS=46−NCAS−NMASK, otherwise PS=47−NCAS−NMASK A counter (SBP) 35 in the predictor is used to keep track of the current location in the multiframe structure. The length of the multiframe structure (LMFS) is determined as: follows:

For DS1 transmission, LMFS=24×N+rounded up value of (N/2)
For E1 transmission, LMFS=16×N+rounded up value of (N/2)

The LMFS value minus 1 is loaded into counter 35 and this counter is decremented each time a payload byte is written to the cell. When the counter reaches 0 it is re-loaded with LFSM−1. The value in SBP counter 35 represents the distance (in octets) to the next multiframe structure boundary and is used in the offset field of the pointer byte of a pointer cell. Another counter is used to keep track of the sequence number (SN) of the next cell. This is used to generate the AAL1 Header byte. A flag is used to indicate that a pointer has been sent to ensure that only a single pointer cell is produced in any eight cell sequence. The following algorithm is used to determine if the next cell is a pointer cell:
If the SN is an even number,
then if the pointer_sent flag=FALSE
and if the current count of SBP is less than 94 OR if the SN=6,
then set the pointer_cell signal=TRUE and the pointer_sent flag=TRUE
else if the pointer_sent flag=TRUE
then set the pointer_cell signal=FALSE
else the pointer_cell=FALSE
if the SN=7, then set pointer_sent=FALSE
end The size of the AAL1 User Information Field (AUI) is determined as follows:
If the pointer_cell=TRUE, then AUI=46
otherwise AUI=47

It is necessary to determine the number of masking octets (NMASK) in the next cell.

If the ATM virtual circuit VC is not using DSS the number of masking octets (NMASK) in the next cell is always 0.

The ATM Forum specification, af-vtoa-0085.000, defines type1 and type2 multiframe structures which are used in DSS. The type1 multiframe structure contains, in addition to the signalling and payload substructures, a bit mask substructure. The length of the Bit Mask Substructure (LBMS) is selected by the user at the time of configuration of the interworking function and will be between 1 and 4 octets inclusive. The type 2 multiframe structure is identical to the non DSS CES multiframe structure. A type 1 structure is to be sent after a valid pointer has been sent. As a result of this requirement a cell will contain between 0 and 4 masking octets.

After a valid pointer has been sent and the end of the current type2 structure has occurred SBP is loaded with the type 1 structure length−1. The type 1 structure length is calculated as follows:
DS1:LMFSt1=24×N+roundup(N/2)+LBMS
E1:LMFSt1=16×N+roundup(N/2)+LBMS A 2 bit current bit mask counter (CBC) is used to keep track of the current position within the bit masking substructure. SBP is compared with LMFSt1 to determine the location within the multiframe structure.

If the first byte to be written to the next cell is from the Bit Mask Substructure then the number of Bit Mask Octets in the next cell is determined using the following algorithm:

---

If the chip is NOT in DSS mode the
    NMASK = 0
Otherwise, if the chip is in DSS mode then
    If the byte being processes is (In the Bit Mask Substructure) then
    NMASK = LBMS − CBC
else if the byte being processed is (NOT in Bit Mask Substructure AND Valid Pointer Was Sent) then
    if(SBP < AUI) begin
        if(AUI − SBP < LBMS) then
            NMASK = AUI − SBP
        else
            NMASK = LBMS
otherwise
    NMASK = 0
end

---

The number of CAS octets in the cell is determined as follows:
Determine the length of the signalling substructure (LSS)
LSS=roundup(N/2)
N is the number of TDM channels in the multiframe structure.

Three special cases exist when the length of the multiframe is less than the length of the cell payload. These special cases and the method for determining NCAS are described as follows:
1) DS1 multiframe with N=1
If (SBP=0) then NCAS=1
else if((NMASK+SBP+25)>AUI) then NCAS=1
else NCAS=2

2) E1 multiframe with N=1
   If (SBP=0) then NCAS=2
   else if(NMASK+SBP+34)>AUI) then NCAS=2
   else NCAS=3
3) E1 multiframe with N=2
   If (SBP=0) then NCAS=1
   else if(NMASK+SBP+34)>AUI) NCAS=1
   else NCAS=2
   In all other cases NCAS is determined as follows:
   If (SBP>NMASK+AUI) then NCAS=0
   else if (SBP>=AUI) NCAS=LSS-SBP-AUI
   else if (SBP>LSS) NCAS=LSS
   else NCAS=SBP When the number of channels in the virtual circuit exceeds the payload size of the cell, it is sometimes necessary to send more than one cell in a TDM frame. Subsystem 40 will signal the segmentation block 10 to produce multiple cells in a TDM frame when there is a sufficient amount of TDM information to fill multiple cells.

The segmentation block 10 contains a counter 13 (current_channel) which is incremented each time a channel is written to a cell. The counter 13 is reset after a count of N (N=number of channels in the VC). This counter is also used to place TDM channels in the cell payload in a round robin fashion as required by ITU-T COM 13-R 51-E.

Summation block 41 subtracts current_channel from N and the result is compared to the predicted size of the payload of the next cell by Comparator 42.

The sample timer 43 is used to evenly distribute production of the cells over the TDM. frame period and thus minimize the peak cell rate. A typical device will support virtual channels with up to 128 channels. It is therefore necessary to produce up to three cells from a TDM frame. The sample timer will limit the period between the cells to no less than 125 us/3=42 uS.

Dynamic Structure Sizing (DSS) involves adding and removing TDM channels from a virtual circuit "on the fly". The period between cells depends on the number of channels in the virtual circuit and will therefore change when the number of active channels N changes. If a re-size, that is a change in the number of channels being carried by a virtual circuit, occurs part of the way through the next cell, then determining the number of TDM frames to wait before sending the next cell becomes very difficult.

The invention provides a solution to this problem. It is first necessary to determine if a re-size occurs in the next cell. In the case of an active structure the following three conditions must be met in order for a re-size to occur in the next cell:

A request for re-size must have occurred

A valid pointer must have been sent in the current structure

A structure boundary must exist in the next cell.

The predictor circuit 34 uses the SBP counter 35 and pointer algorithm to determine if there is a re-size in the next cell.

When determining the number of frames to wait before producing the next cell N, the next cell is assigned the number of channels in the smaller multiframe structure. For example when a re-size from 2 to 11 occurs, the next cell N containing the structure boundary would be assigned a value of 2. This will cause D>0, after the next cell is produced, due to the fact that the segmentation block 10 would have waited for too many TDM frames to elapse before the cell was sent. The CTRCS will then inherently produce cells at a higher than nominal rate until the error D is reduced to 0. The CTRCS thus provides a solution to the problem of determining when to send a cell, containing a re-size, by virtue of the self correcting nature of the system.

Glossary

AAL1—ATM Adaptation Layer 1—ATM Adaptation Layers are identified by numbers ranging from 1 to 5 that deal with various types of service. AAL1 is the service that relates to constant bit rate traffic such as voice traffic. Other layers relate to other types of traffic.

ATM—Asynchronous Transfer Mode—A network connection configuration where the source and the destinations are on different clock sources (thus asynchronous) but the information being transferred is contained in equal sized cells.

CBR—Constant Bit Rate—A type of data transfer where the data is being presented at the point of transmission at a constant rate, regardless of the amount of data that needs to be sent. A specified silence word is being transmitted when there is no data to send.

CES—Circuit Emulation Service—A type of ATM service that appears to both parties like a circuit connection such as telephone calls with a constant bit rate type of data transfer.

DBCES—Dynamic Bandwidth Circuit Emulation Service—In order to reduce silence being transmitted along unused portions of the bandwidth within a circuit emulation level of service in the ATM network, the bandwidth is dynamically allocated across the ATM network. This reduces the total required bandwidth in ATM trunked networks.

DSS—Dynamic Structure Sizing—Changing the configuration of the device driving traffic into the ATM network to reduce overhead traffic in dormant virtual circuits.

SAR—Segmentation and Re-assembly—This is the process of taking in TDM data streams and segmenting them into ATM cells. And conversely, taking in ATM cells and re-assembling them into TDM streams.

TDM—Time Division Multiplexed—The multiplexing of numerous data streams onto the same circuit using a time allocation scheme.

VC—Virtual Circuit—A connection that appears to the end user to be a fully circuit connection end to end but actually is routed through numerous networks and so does not have a physical connection them.

I claim:

1. A cell transmission rate controller for use in providing constant bit rate services in a cell relay network, comprising:
   a predictor for determining the payload size of the next cell in a virtual circuit established in said cell relay network; and
   a control circuit for monitoring buffers storing TDM data and generating a trigger signal to produce a cell when sufficient TDM data has accumulated to fill the next cell.

2. A cell rate transmission controller as claimed in claim 1, wherein said control circuit monitors a plurality of buffers, one for each channel in said virtual circuit.

3. A cell rate transmission controller as claimed in claim 2, wherein said buffers are circular buffers.

4. A cell rate transmission controller as claimed in claim 1, wherein said control circuit comprises a counter for counting the number of frames D accumulated since the last cell was transmitted and a multiplier determines the amount of accumulated data to be transmitted by multiplying D by the number of channels contained in said virtual circuit.

5. A cell rate transmission controller as claimed in claim 1, wherein said predictor determines the number of payload bytes by determining if the next cell is a pointer cell.

6. A cell rate transmission controller as claimed in claim 5, wherein said predictor includes a counter for tracking the current location in the multiframe TDM structure to determine whether said next cell is a pointer cell.

7. A cell rate transmission controller as claimed in claim 5, wherein said predictor also determines the number of masking and CAS octets in the next cell to determine the number of payload bytes.

8. A cell rate transmission controller as claimed in claim 5, further comprising a sample timer to evenly distribute the production of multiple cells over a TDM frame period when the number of channels in the virtual circuit exceeds the payload size of the cell.

9. A cell rate transmission controller as claimed in claim 5, wherein said predictor determines whether a re-size occurs in the next cell and assigns a number of channels to a cell containing a re-size equal to the smaller number of channels, leaving excess data remaining after transmission of the cell, wherein said controller produces cells at a higher than normal rate until said excess have been reduced to zero.

10. A cell rate transmission controller as claimed in claim 9, wherein said predictor uses said counter to identify when a re-size occurs in the next cell.

11. A method of controlling the rate of in a cell relay network offering constant bit rate services, comprising the steps of:
predicting the payload size of the next cell in a virtual circuit established in said cell relay network; and
monitoring buffers storing TDM data and generating a trigger signal to produce a cell when sufficient TDM data has accumulated to fill the next cell.

12. A method as claimed in claim 11, wherein a buffer is monitored for each channel in said virtual circuit.

13. A method as claimed in claim 12, wherein said buffers are circular buffers.

14. A method as claimed in claim 11, wherein the number of frames D accumulated since the last cell was transmitted are counter, and then D is multiplied by N, the number of active channels in the virtual circuit to determine the number of bytes accumulated since the last cell was transmitted.

15. A method as claimed in claim 14, wherein the number of payload size is determined by determining if the next cell is a pointer cell, determining the number of masking bytes, and the number of CAS bytes.

16. A method as claimed in claim 15, the current location in the multiframe structure is tracked to determine whether said next cell is a pointer cell.

17. A method as claimed in claim 11, wherein the number of channels in the virtual circuit exceeds the payload size of the cell, and a sample timer evenlys distribute the production of multiple cells over a TDM frame period.

18. A method as claimed in claim 11, wherein when a re-size occurs in the next cell a number of channels equal to the smaller number of channels after the re-size is assigned to the next cell, leaving excess data remaining after transmission of the cell, wherein cells are produced at a higher than normal rate until said excess data have been reduced to zero.

* * * * *